(12) United States Patent
Yeh (10) Patent No.: US 12,405,913 B2
(45) Date of Patent: Sep. 2, 2025

(54) ASYNCHRONOUS BRIDGE, AND ASYNCHRONOUS PROCESSING METHOD

(71) Applicant: Nuvoton Technology Corporation, Hsinchu Science Park (TW)

(72) Inventor: Szu-Wei Yeh, Hukou Township (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 124 days.

(21) Appl. No.: 18/401,474

(22) Filed: Dec. 30, 2023

(65) Prior Publication Data

US 2025/0028669 A1 Jan. 23, 2025

(30) Foreign Application Priority Data

Jul. 18, 2023 (TW) .................................. 112126635

(51) Int. Cl.
  *G06F 13/40* (2006.01)
  *G06F 9/38* (2018.01)
  *G06F 13/42* (2006.01)

(52) U.S. Cl.
  CPC .......... *G06F 13/405* (2013.01); *G06F 9/3814* (2013.01); *G06F 13/423* (2013.01)

(58) Field of Classification Search
  CPC ............... G06F 13/4027; G06F 13/405; G06F 13/4059; G06F 13/423; G06F 9/3814
  See application file for complete search history.

(56) References Cited

U.S. PATENT DOCUMENTS

| | | | | |
|---|---|---|---|---|
| 2003/0093608 A1* | 5/2003 | Jaramillo | ............ | G06F 13/4059 710/310 |
| 2006/0294316 A1* | 12/2006 | Ho | ....................... | G06F 12/0862 711/137 |
| 2008/0162769 A1* | 7/2008 | Wojciechowski | .. | G06F 13/4059 710/308 |
| 2013/0138848 A1 | 5/2013 | Jeong et al. | | |

(Continued)

FOREIGN PATENT DOCUMENTS

| | | |
|---|---|---|
| CN | 104850524 B | 6/2018 |
| TW | I332147 B | 10/2010 |

(Continued)

OTHER PUBLICATIONS

Office Action mailed Dec. 19, 2023 in corresponding TW Application 112126635, 5 pages.

*Primary Examiner* — Phong H Dang
(74) *Attorney, Agent, or Firm* — Muncy, Geissler, Olds & Lowe, P.C.

(57) ABSTRACT

An asynchronous bridge with command prefetching, including a command prefetcher as well as a command receiver. The command receiver receives a first command from a first-clock computing device. The first command is issued to operate a second-clock computing device. The command prefetcher prefetches a second command from the first-clock computing device before the first-clock computing device receives notice of execution completion of the first command. In this manner, when the command receiver receives the second command (that the first-clock computing device formally issues to operate the second-clock computing device), the second-clock computing device already operates in response to the prefetched second command.

21 Claims, 7 Drawing Sheets

(56) References Cited

U.S. PATENT DOCUMENTS

2014/0101354 A1*  4/2014  Liu ..................... G06F 13/1678
                                                          710/308
2020/0082263 A1*  3/2020  Song ..................... G06N 3/063
2020/0117606 A1*  4/2020  Wu ..................... G06F 12/0811
2022/0019536 A1*  1/2022  Narsale ............... G06F 12/0862

FOREIGN PATENT DOCUMENTS

TW          I695269 B      6/2020
TW          I805820 B      6/2023

* cited by examiner

ASYNCHRONOUS BRIDGE, AND ASYNCHRONOUS PROCESSING METHOD

CROSS REFERENCE TO RELATED APPLICATIONS

This application claims priority of Taiwan Patent Application No. 112126635, filed on Jul. 18, 2023, the entirety of which is incorporated by reference herein.

BACKGROUND OF THE INVENTION

Field of the Invention

The present invention relates to asynchronous processing method for communication between devices running different clocks.

Description of the Related Art

Functional blocks within a system on a chip (SoC) often operate different clocks. For example, within an SoC, the operating clock of a digital signal processor (DSP) may be as high as 300 MHz, while the operating clock of a central processing unit (CPU) may be only 200 MHz. The DSP and CPU are asynchronous devices. If the DSP wants to read data from the CPU, it needs to use an asynchronous bridge (such as an AHB-to-AHB bridge of an on-chip bus technology) to handle asynchronous situations between the DSP and the CPU.

How to improve the performance of an asynchronous bridge is an important issue in this technical field.

BRIEF SUMMARY OF THE INVENTION

An asynchronous bridge in accordance with an exemplary embodiment of the disclosure has a command receiver and a command prefetcher. The command receiver receives a first command from a first-clock computing device, wherein the first command is issued to operate a second-clock computing device. The command prefetcher prefetches a second command from the first-clock computing device before the first-clock computing device receives notice of execution completion of the first command. In this manner, when the first-clock computing device formally issues to operate the second-clock computing device and the command receiver receives the second command, the second-clock computing device already operates in response to the prefetched second command. The system performance is considerably improved.

Specifically, the command prefetcher prefetches the second command from the first-clock computing device before the second-clock computing device formally issues the second command to operate the second-clock computing device. In response to the second command that the second-clock computing device formally issues to operate the second-clock computing device, the command receiver receives the second command. The prefetching happens earlier than the formally issuing.

In an exemplary embodiment, the asynchronous bridge further includes a prefetch buffer and a command processor. The command processor receives a prefetch request that is generated by the command prefetcher in response to the prefetched second command, reads prefetched data from the second-clock computing device in response to the prefetch request, and stores the prefetched data in the prefetch buffer. The prefetched data stored in the prefetch buffer is returned to the first-clock computing device when the command receiver receives the second command from the first-clock computing device.

In an exemplary embodiment, the prefetch buffer is managed by a prefetch list. In response to the command processor storing the prefetched data in the prefetch buffer, the command prefetcher programs the prefetch list to relate the prefetched data with the second command.

In an exemplary embodiment, when receiving the second command, the command receiver checks the prefetch list. When the command receiver learns that the prefetched data related with the second command is stored in the prefetch buffer, the command receiver reads the prefetched data from the prefetch buffer to return the prefetched data to the first-clock computing device.

In an exemplary embodiment, the asynchronous bridge further includes a read buffer, for performing asynchronous processing on a non-prefetched read command that is issued by the first-clock computing device to operate the second-clock computing device.

In an exemplary embodiment, the first command is a read command. When the command receiver receives the first command and confirms that the first command is not recorded in the prefetch list, the command receiver generates a read request to operate the command processor. In response to the read request, the command processor obtains read data from the second-clock computing device and stores the read data in the read buffer to be returned to the first-clock computing device.

Specifically, the command processor processes the read request with a priority higher than that of the prefetch request.

In an exemplary embodiment, in response to the second command, different from the first command, requested by a direct memory access module of the first-clock computing device, the command prefetcher downloads the second command from the direct memory access module, and generates the prefetch request to operate the command processor. In response to the command processor, the second-clock computing device outputs the read data requested by the first command and the prefetched data requested by the second command in sequence. In this manner, the second command is completed along with the first command, significantly improving the system performance.

The aforementioned concepts are further applied to implement an asynchronous processing method for devices running different clocks.

An asynchronous processing method in accordance with an exemplary embodiment of the disclosure includes the following steps: receiving a first command from a first-clock computing device, wherein the first command is issued to operate a second-clock computing device; and prefetching a second command from the first-clock computing device before the first-clock computing device receives notice of execution completion of the first command. When the first-clock computing device formally issues the second command to operate the second-clock computing device, the second-clock computing device already operates in response to the prefetched second command.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
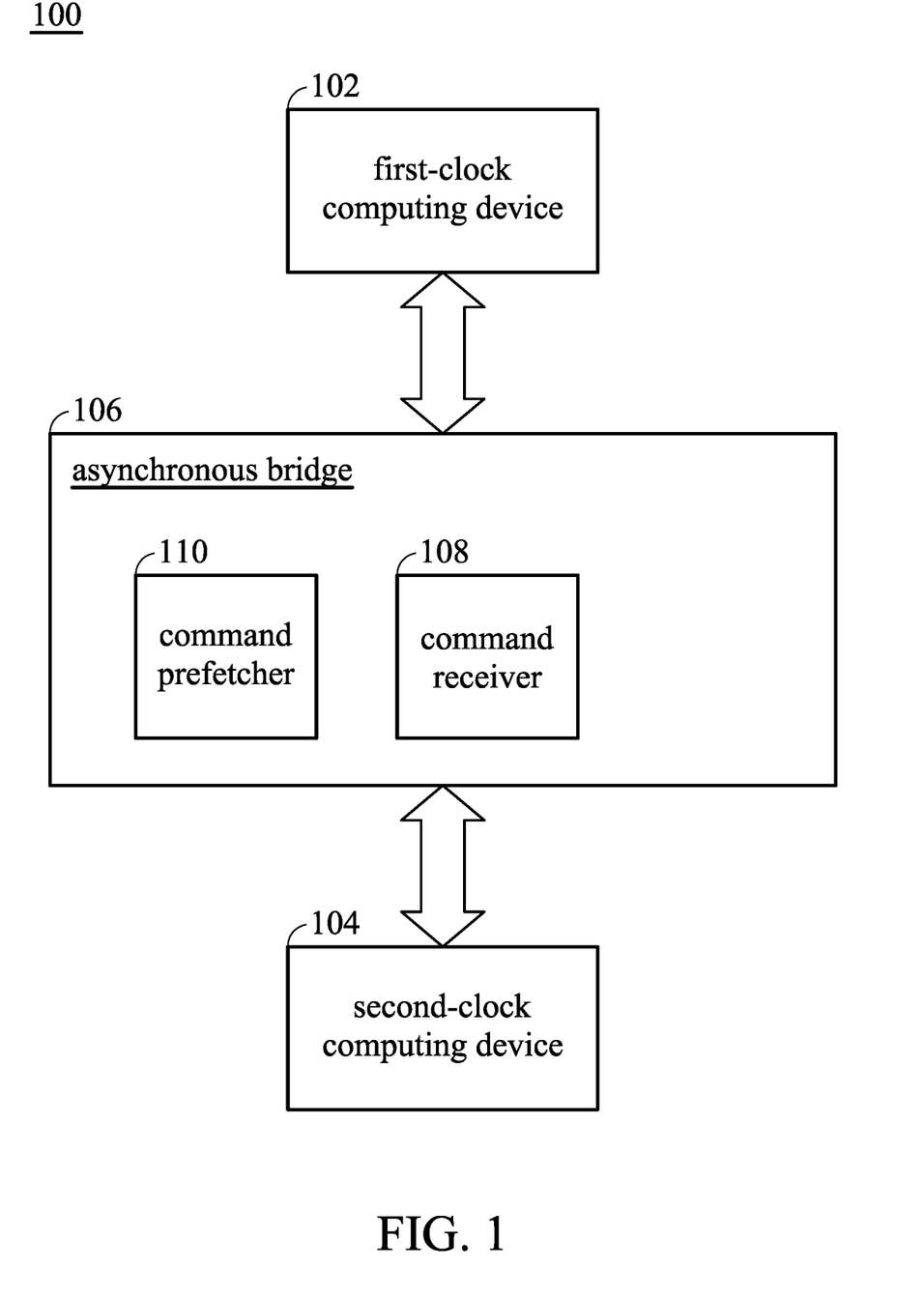
FIG. 1 illustrates a computing system 100 in accordance with an exemplary embodiment of the disclosure.

FIG. 1 illustrates a computing system 100 in accordance with an exemplary embodiment of the disclosure, which includes two computing devices running different clocks. The two computing devices are: a first-clock computing device 102; and a second-clock computing device 104. The first-clock computing device 102 and the second-clock computing device 104 communicate with each other through an asynchronous bridge 106.

In addition to a command receiver 108, the asynchronous bridge 106 further includes a command prefetcher 110. The asynchronous bridge 106 operates the command receiver 108 to receive a first command from the first-clock computing device 102 for asynchronous processing. After the asynchronous processing, the second-clock computing device 104 executes the first command. When the execution of first command is completed and the first-clock computing device 102 receives notice of execution completion of the first command, a second command is issued from the first-clock computing device 102 and received by the command receiver 108 of the asynchronous bridge 106.

In particular, before the command receiver 108 receives the second command from the first-clock computing device 102, the asynchronous bridge 106 has already used the command prefetcher 110 to prefetch the second command from the first-clock computing device 102. The asynchronous bridge 106 can complete the asynchronous processing of the second command before the first-clock computing device 102 receives notice of execution completion of the first command. The second-clock computing device 104 may even start acting in response to the prefetched second command before the first-clock computing device 102 receives notice of execution completion of the first command. In this way, once the command receiver 108 of the asynchronous bridge 106 receives the second command that the first-clock computing device 102 formally issues to operate the second-clock computing device 104, the asynchronous bridge 106 can immediately respond to the first-clock computing device 102. System operation efficiency is greatly improved.

The computing system 100 may have variants. For example, it may be a computer device, a consumer electronic device, or an SoC.

Figure 2:
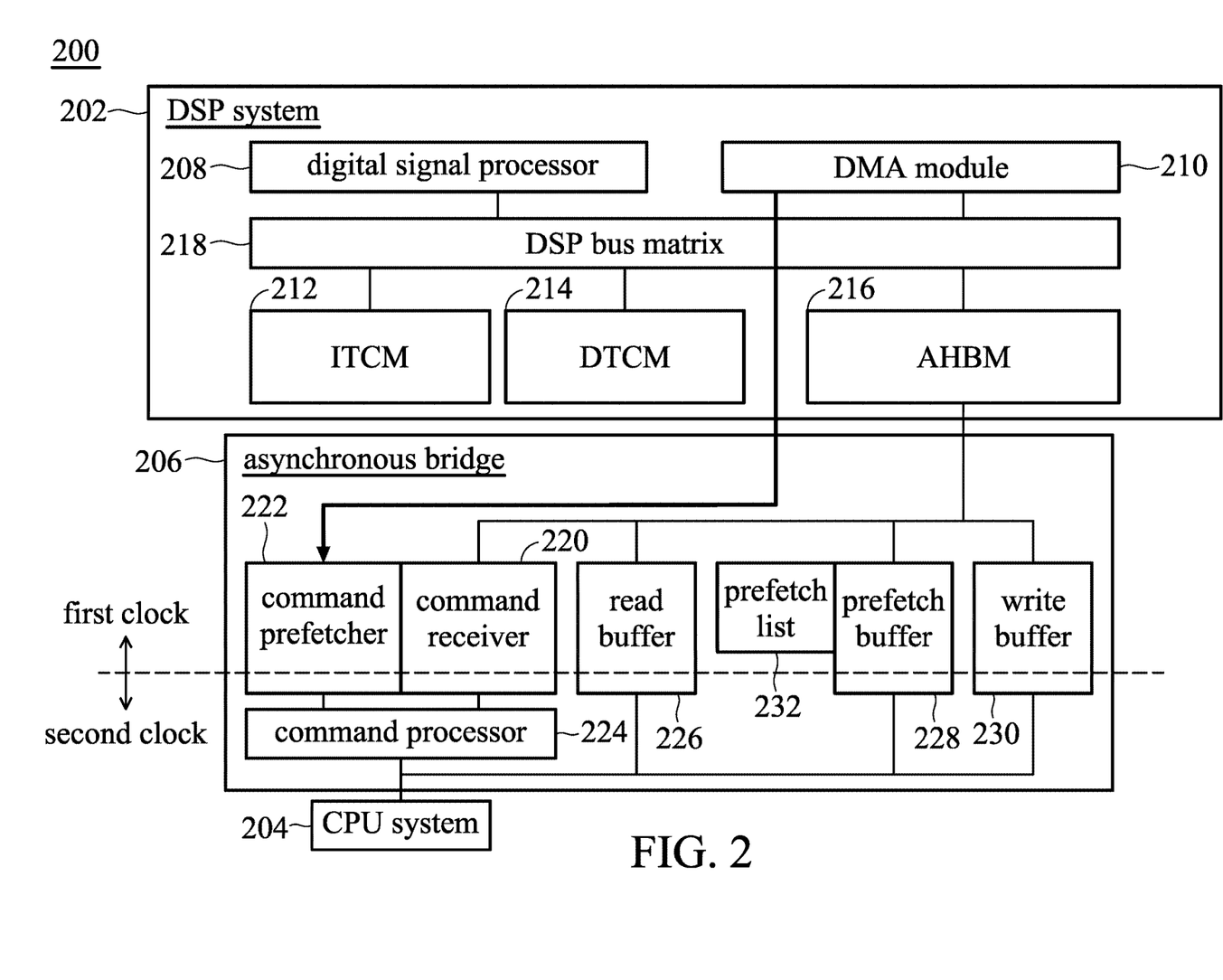
FIG. 2 illustrates that the computing system 100 is an SoC 200.

FIG. 2 illustrates that the computing system 100 is an SoC 200 with a digital signal processor (DSP) system 202 as well as a central processing unit (CPU) system 204. The DSP system 202 is the first-clock computing device 102 presented in FIG. 1, whose operating clock may be as high as 300 MHz. The CPU system 204 is the second-clock computing device 104 presented in FIG. 1, whose operating clock may be 200 MHz, different from the operating clock of the DSP system 202. The asynchronous bridge 206 may be designed based on an on-chip bus technology; for example, the asynchronous bridge 206 may be an AHB-to-AHB bridge. AHB is the abbreviation for Advanced High-Performance Bus.

The DSP system 202 includes a digital signal processor 208, a direct memory access (DMA) module 210, a command memory (ITCM) 212, a data memory DTCM 214, and the master end of an advanced high-performance bus (AHBM) 216. These functional blocks communicate with each other through a DSP bus matrix 218.

The asynchronous bridge 206 is responsible for the asynchronous processing between the devices operates at the different clocks (the first clock and the second clock). The command receiver 220 within the asynchronous bridge 206 is designed based on the AHBM technology, to process the read and write commands transferred from the DSP system 202 through the AHBM 216. The command prefetcher 222 is designed to prefetch commands from the DMA 210. The asynchronous bridge 206 further has a command processor 224, a read buffer 226, a prefetch buffer 228, and a write buffer 230. The contents in the prefetch buffer 228 may be annotated in a prefetch list 232. The read buffer 226, the prefetch buffer 228, and the write buffer 230 may be first-in first-out (FIFO) buffers.

In response to a read command that has not been prefetched, the command receiver 220 issues a read request to the command processor 224 to operate the command processor 224 to read the CPU system 204. The command processor 224 stores the read data obtained from the CPU system 204 in the read buffer 226. By reading the read buffer 226, the command receiver 220 returns the read data to the DSP system 202 whose operating clock is different from that of the CPU system 204.

In response to a write command issued by the DSP system 202, the command receiver 220 issues a write request to the command processor 224. The write data issued from the DSP system 202 is first pushed into the write buffer 230. In response to the write request, the command processor 224 obtains the write data from the write buffer 230 and transfers it to the CPU system 204. In this way, the DSP system 202 can request to write data into the CPU system 204 even if the operating clock of the DSP system 202 is different from the operating clock of the CPU system 204.

As for a read command prefetched from the DSP system 202, the command prefetcher 222 issues a prefetch request to the command processor 224 to operate the command processor 224 to prefetch data from the CPU system 204. The command processor 224 stores the prefetched data returned from the CPU system 204 in the prefetch buffer 228, and the command prefetcher 222 programs the prefetch list 232 to relate the prefetched data with the prefetched read command. Later, when the prefetched read command is officially issued, the command receiver 220 receives it, obtains its record in the prefetch list 232, and determined that the time-consuming asynchronous processing about the officially issued read command is not. The command receiver 220 responds to the DSP system 202 with the prefetched data obtained from the prefetch buffer 228.

In particular, for the command processor 224, a prioritized position of the read request is higher than that of the prefetch request. The prefetching does not slow down the system.

The prefetching is particularly effective for two consecutively-issued read commands. In an exemplary embodiment, after the command receiver 220 receives a first read command, the command prefetcher 222 works once a second read command (which is different from the first read command) appears in the DMA 210. The command prefetcher 222 downloads the second read command from the DMA 210, and issues a prefetch request to the command processor 224. In response to the command processor 224, the CPU system 204 returns the second read data (corresponding to the prefetched second read command) just after the first read data (corresponding to the first read command).

The working flow of the command receiver 220, the command prefetcher 222, and the command processor 224 is discussed in detail below.

Figure 3A:
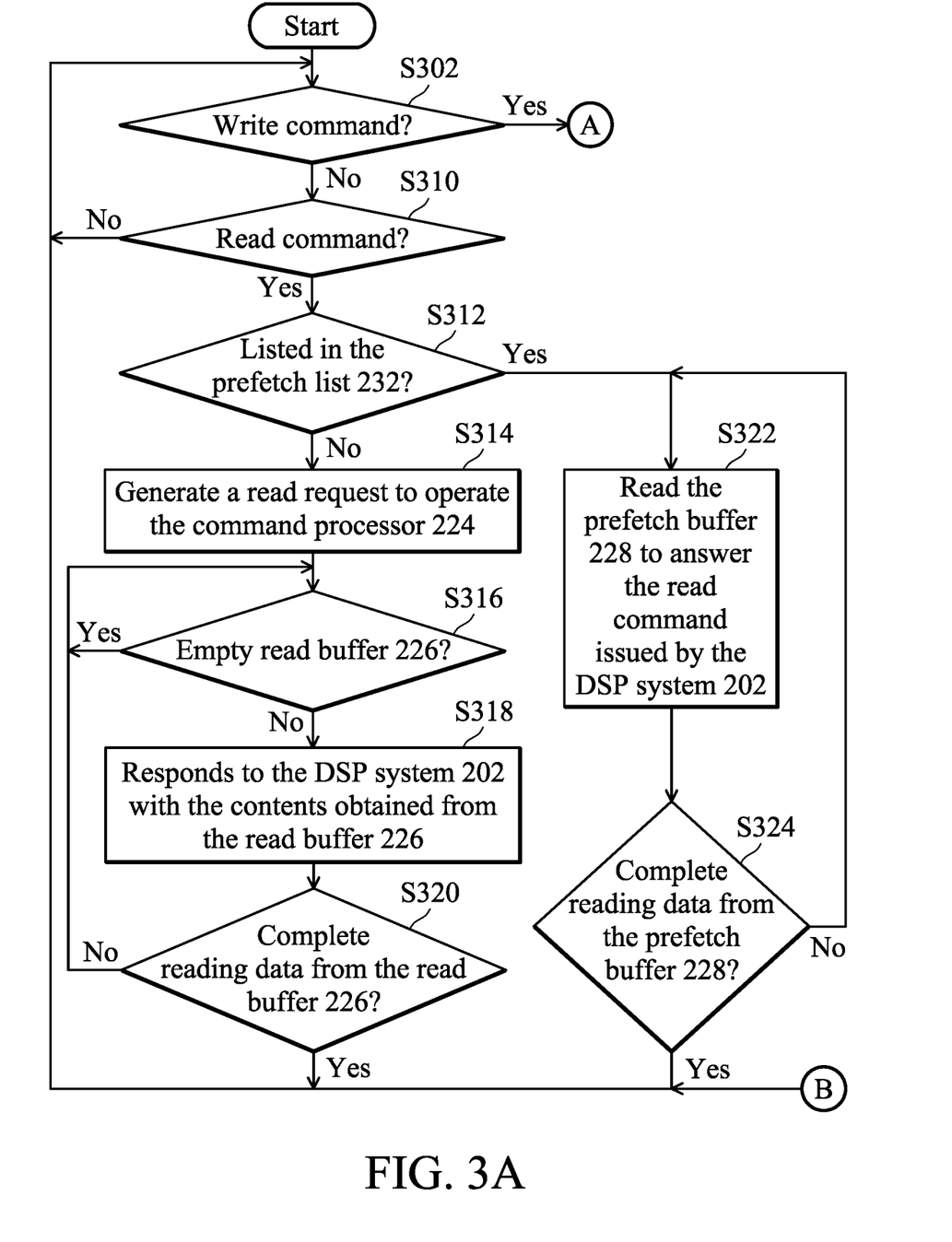
FIGS. 3A and 3B show a flow chart illustrating the work flow of the command receiver 220 in accordance with an exemplary embodiment of the disclosure.
Figure 3B:
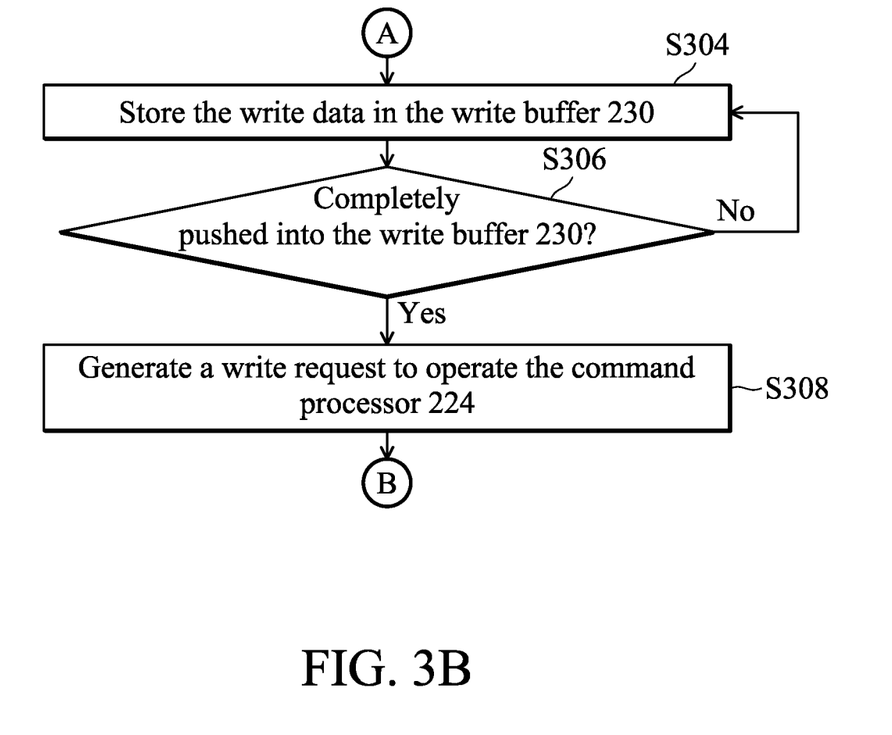

FIG. 3A and FIG. 3B show a flow chart illustrating the work flow of the command receiver 220 in accordance with an exemplary embodiment of the disclosure. Referring to the DSP system 202, the DSP 208 (or DMA 210) transmits write or read commands to the command receiver 220 of the asynchronous bridge 206 through the DSP bus matrix 218 and the AHBM 216. In response to the received command, the command receiver 220 works according to the procedure illustrated in FIGS. 3A and 3B.

In step S302, the command receiver 220 determines whether the received command is a write command. If yes, the procedure proceeds to step S304 to store the write data in the write buffer 230 until step S306 determines that the write data is completely pushed into the write buffer 230. In step S308, the command receiver 220 generates a write request, and outputs it to the command processor 224. In response to the write request, the command processor 224 moves the contents of the write buffer 230 to the CPU system 204.

If step S302 determines that the received command is not a write command, the command receiver 220 further determines whether it is a read command in step S310. If so, the command receiver 220 proceeds to step S312 to determine whether the currently received read command is listed in the prefetch list 232. If the read command is not listed in the prefetch list 232, the command receiver 220 generates a read request and outputs it to the command processor 224 in step S314. In response to the read request, the command processor 224 obtains the read data from the CPU system 204 and stores the read data in the read buffer 226. In step S316, the command receiver 220 monitors whether the read buffer 226 is empty or not. Once the read buffer 226 stores the read data, according to step S318, the command receiver 220 responds to the DSP system 202 with the contents obtained from the read buffer 226 until step S320 determines that the read data is completely returned to the DSP system 202.

If step S312 determines that the read command currently received by the command receiver 220 is listed in the prefetch list 232, according to the step S322, the command receiver 220 reads the prefetch buffer 228 to answer the read command issued by the DSP system 202. Step S324 determines whether the prefetched data is completely returned to the DSP system 202.

Compared with the processing program (S314~S320) of a non-prefetched read command, the processing program (S322 and S324) of a prefetched read command simply responds to the DSP system 202 with the content of the prefetch buffer 228. The time-consuming command processor 224 operations and the CPU system 204 reading are completed in the early time. System performance is greatly improved.

Figure 4:
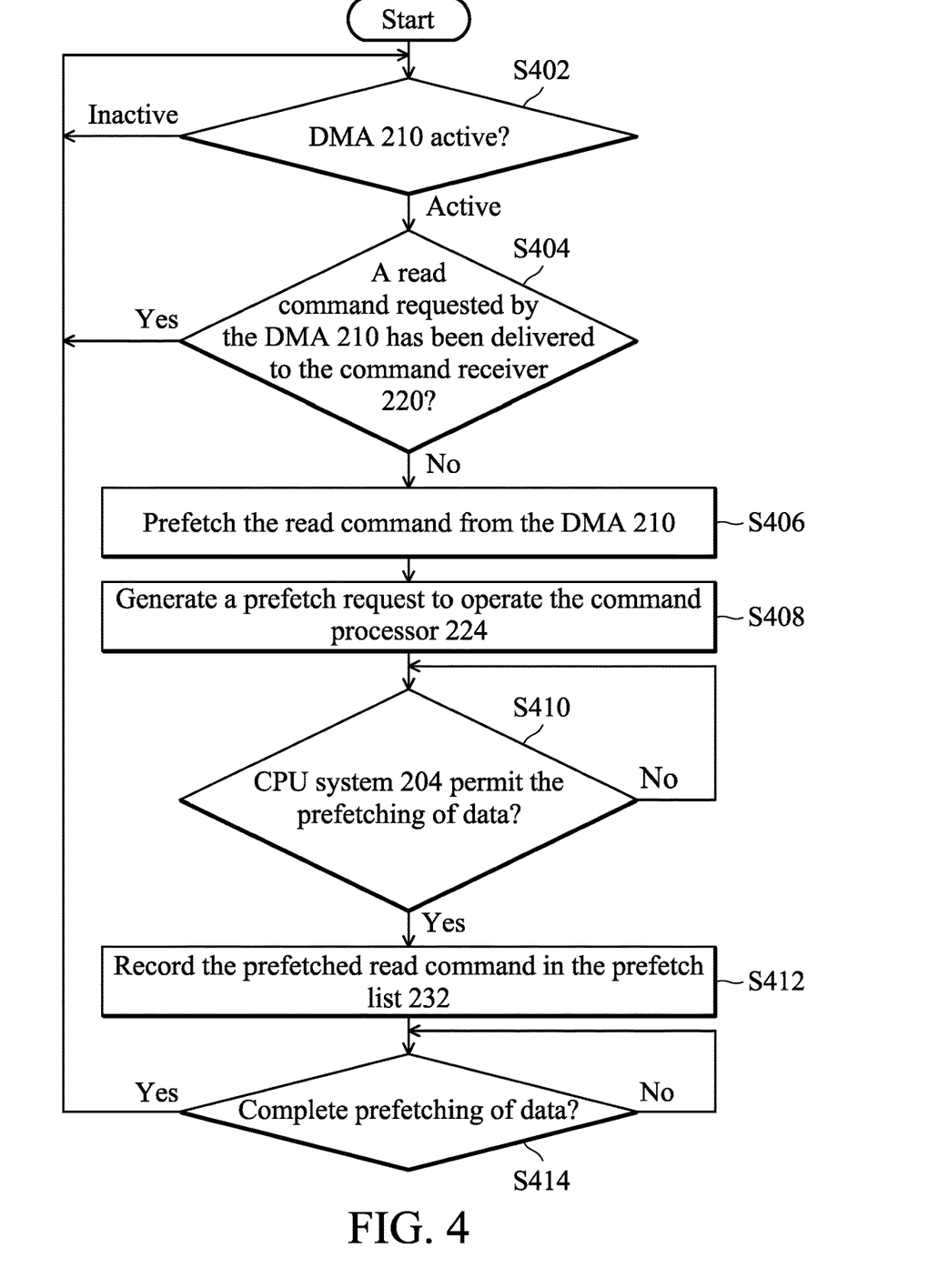
FIG. 4 is a flow chart illustrating the work flow of the command prefetcher 222 in accordance with an exemplary embodiment of the disclosure.

FIG. 4 is a flow chart illustrating the work flow of the command prefetcher 222 in accordance with an exemplary embodiment of the disclosure. In an exemplary embodiment, the command prefetcher 222 utilizes the idle period of the AHBM 216 (which is idle without transmitting commands to the command receiver 220) to prefetch the next command that the DMA 210 is going to officially issues. The prefetching of read command is discussed here. A read command may indicate a read address, a read size, and a burst number. Since the read command is directly prefetched from the DMA 210, it is quite accurate. Such command prefetching techniques are particularly useful for optimizing writing data into the DSP system 202 (e.g., writing to the DMA 210 or DSP 208).

In step S402, the command prefetcher 222 determines whether the DMA 210 is active. If so, according to step S404, the command prefetcher 222 determines whether a read command requested by the DMA 210 has been delivered to the command receiver 220. When the read command requested by the DMA 210 has not been delivered to the command receiver 220, the procedure proceeds to step S406, by which the command prefetcher 222 prefetches the read command from the DMA 210. In step S408, the command prefetcher 222 generates a prefetch request, and delivers it to the command processor 224. Step S410 checks whether the CPU system 204 permits the prefetching of data. If the CPU system 204 permits the prefetching of data, the procedure proceeds to step S412 to record the prefetched read command in the prefetch list 232 and, accordingly, the command processor 224 prefetches the requested data from the CPU system 204 and stores the prefetched data in the prefetch buffer 228. Step S414 determines whether the prefetching of data is completed.

Figure 5:
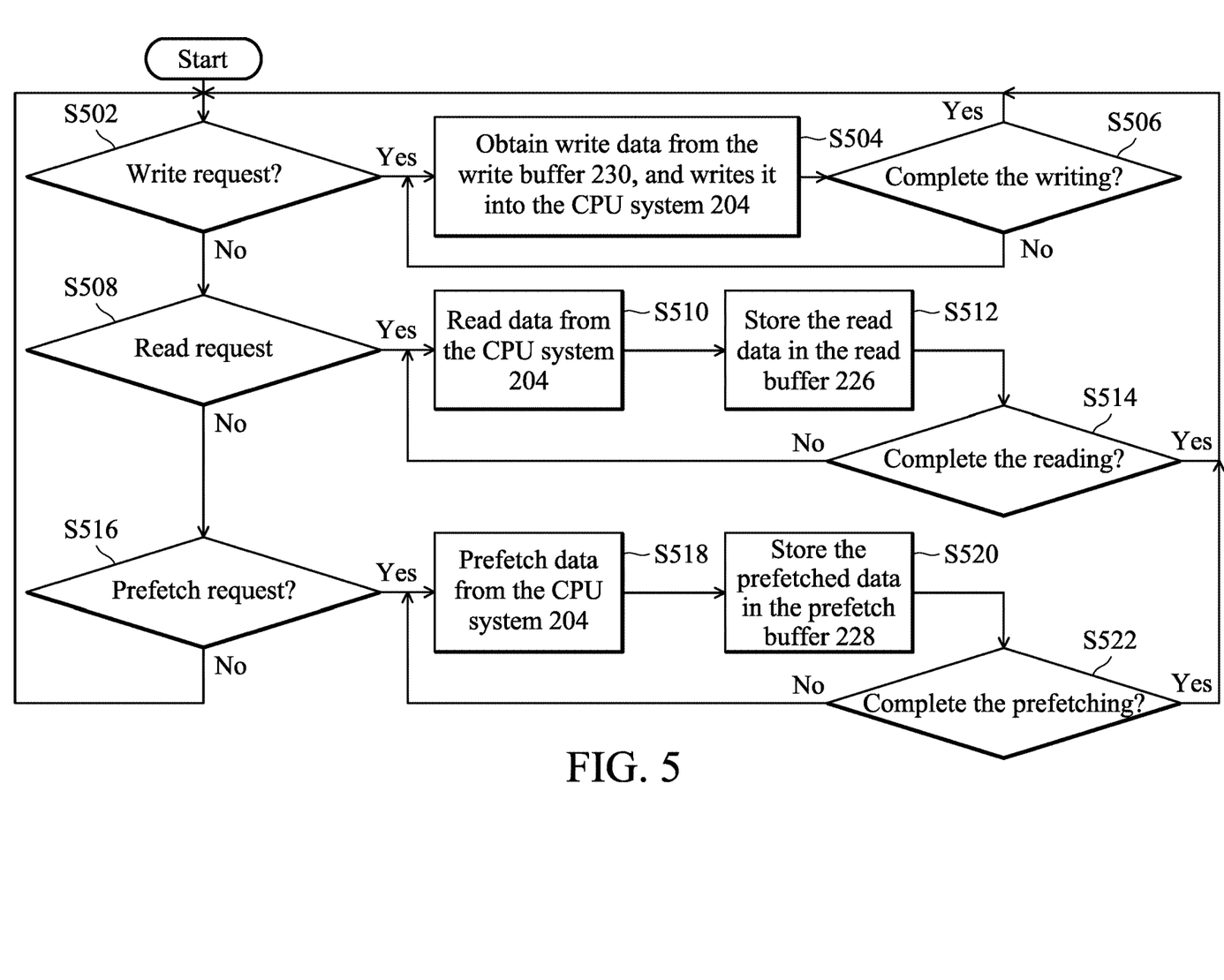
FIG. 5 is a flow chart illustrating the work flow of the command processor 224 in accordance with an exemplary embodiment of the disclosure.

FIG. 5 is a flow chart illustrating the work flow of the command processor 224 in accordance with an exemplary embodiment of the disclosure.

In step S502, the command processor 224 determines whether the received request is a write request sent from the command receiver 220. If so, the procedure proceeds to step S504. In step S504, the command processor 224 obtains write data from the write buffer 230, and writes it into the CPU system 204. Step S506 determines whether the writing is completed.

If step S502 determines that the request received by the command processor 224 is not a write request, the procedure proceeds to step S508. The command processor 224 determines whether the received request is a read request sent from the command receiver 220. If so, the procedure proceeds to step S510, and the command processor 224 obtains the read data from the CPU system 204. Next, according to step S512, the command processor 224 stores the read data in the read buffer 226. Steps S510 and S512 are executed repeatedly until step S514 determines that the reading is completed.

If step S508 determines that the request received by the command processor 224 is not a read request, the procedure proceeds to step S516. The command processor 224 determines whether the received request is a prefetch request sent from the command prefetcher 222. If so, the procedure proceeds to step S518, and the command processor 224 prefetches data from the CPU system 204. Next, according to step S520, the command processor 224 stores the prefetched data in the prefetch buffer 228. Steps S518 and S520 are executed repeatedly until step S522 determines that the prefetching is completed.

The flow chart in FIG. 5 shows that the priority order of the requests sent to the command processor 224 from high to low is: the write request sent from the command receiver 220; the read request sent from the command receiver 220; and the prefetch request sent from the command prefetcher 222.

Figure 6:
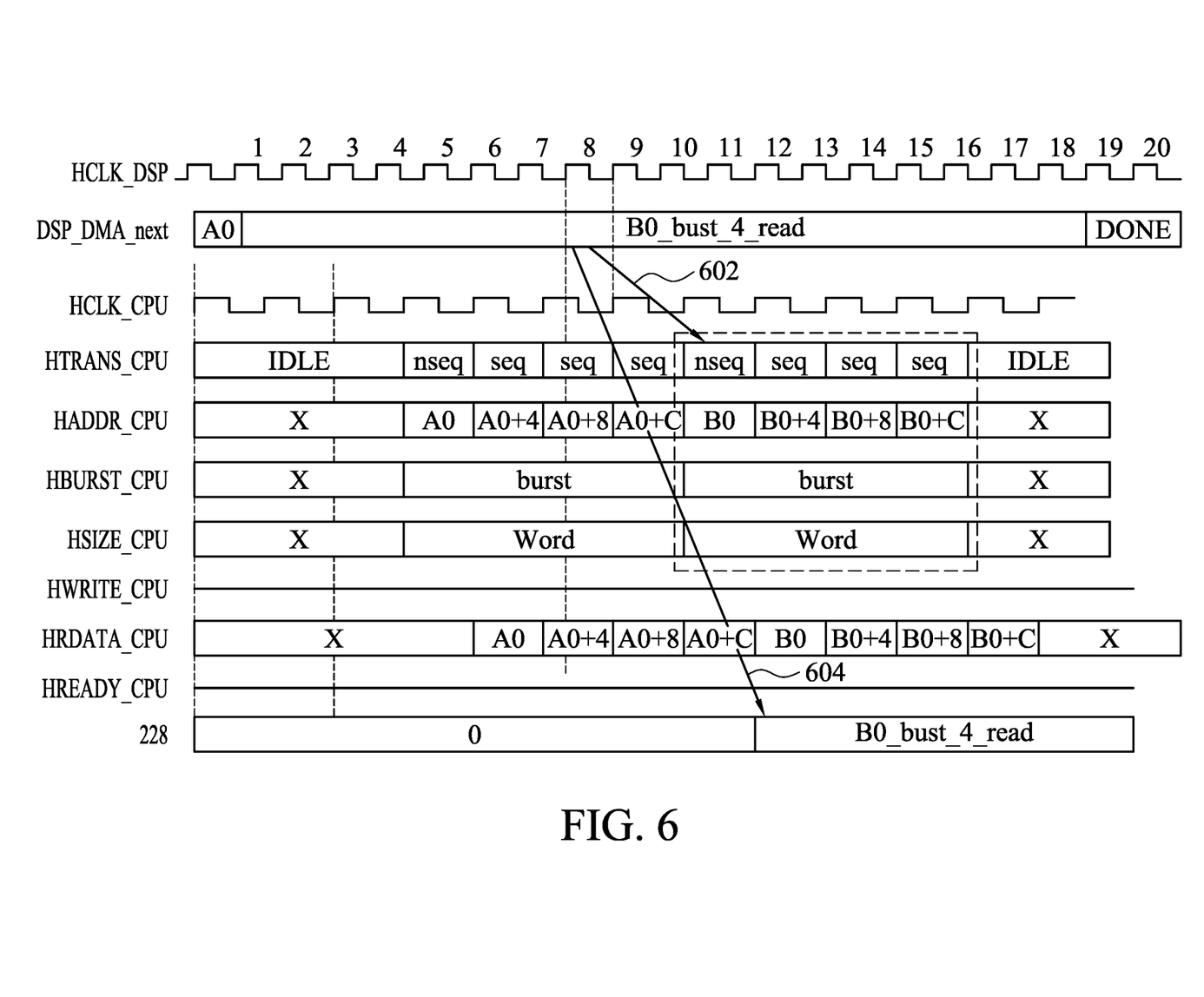
FIG. 6 is a waveform diagram illustrating the signal waveforms of the DSP system 202 and the CPU system 204 in accordance with an exemplary embodiment of the disclosure.

FIG. 6 is a waveform diagram illustrating the signal waveforms of the DSP system 202 and the CPU system 204 in accordance with an exemplary embodiment of the disclosure. Here the CPU system 204 is designed to provide four pieces of consecutive data at a time. In FIG. 6, four pieces of consecutive data (each piece is represented by "seq") form a word that is represented by "burst".

The DSP system 202 operates according to clock HCLK_DSP, which is at the higher frequency than the operating clock HCLK_CPU of the CPU system 204. Referring to the signal DSP_DMA_next, the DMA 210 on the DSP system 202 not only requests to read A0, but also requests to read four pieces of data B0_bust_4_read starting from B0. The signals of the CPU system 204 include: HTRANS_CPU, HADDR_CPU, HBURST_CPU, HSIZE_CPU, HWRITE_CPU, HRDATA_CPU, and HREADY_CPU. After the idle period IDLE, the CPU system 204 operates in response to the read command (to read A0) issued from the DSP system 202; wherein the CPU system 204 outputs A0, A0+4, A0+8, and A0+C in sequence. Referring to timing 8 indicated by HCLK_DSP, before the four pieces of data A0, A0+4, A0+8, and A0+C related to the reading of A0 are returned completely, the command prefetcher 222 of the asynchronous bridge 206 prefetches a read command (to read B0_bust_4_read) from the DSP system 202. Later, when the CPU system 204 officially issues the read command of B0_bust_4_read, the asynchronous bridge 206 can omit the asynchronous processing of the read command (B0_bust_4_read). In practical, the CPU system 204 returns four pieces of data A0, A0+4, A0+8, and A0+C, and then, as indicated by the arrow 602, returns the four pieces of data B0, B0+4, B0+8, and B0+C just after A0~A0+C. It seems like the read command of A0 triggers not only the reading of A0~A0+C, but also the reading of B0~B0+C. Arrow 604 shows that the four pieces of data B0, B0+4, B0+8, and B0+C are successfully prefetched to the prefetch buffer 228, and can be sent to the DSP system 202 following the reading of data A0. The waveform in FIG. 6 shows that even though the data B0 is not the continuous data of A0+C (B0 is marked as nseq), A0 and B0 are still returned to the CPU system 204 in sequence.

Any asynchronous processing technology implemented by command prefetching is within the scope of the disclosure.

The aforementioned concept may be further used to implement an asynchronous processing method, including: receiving a first command that a first-clock computing device (102/202) issues to operate a second-clock computing device (104/204); and prefetching a second command from the first-clock computing device (102/202) before the first-clock computing device (102/202) receives notice of execution completion of the first command. In this manner, when the first-clock computing device (102/202) formally issues the second command to operate the second-clock computing device (104/204), the second-clock computing device (104/204) already operates in response to the prefetched second command. For example, data may be prefetched from the second-clock computing device (104/ 204) and stored in the asynchronous bridge (106/206) to be returned to the first-clock computing device (102/202). In such a design, the second-clock computing device (104/204) can respond to the officially issued second command immediately.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An asynchronous bridge, comprising:
   a command receiver, receiving a first command from a first-clock computing device, wherein the first command is issued to operate a second-clock computing device; and
   a command prefetcher, prefetching a second command from the first-clock computing device before the first-clock computing device receives notice of execution completion of the first command, wherein the second command is issued to operate the second-clock computing device;
   wherein, when the command receiver receives the second command from the first-clock computing device, the second-clock computing device already operates in response to the prefetched second command.

2. The asynchronous bridge as claimed in claim 1, wherein:
   the command prefetcher prefetches the second command from the first-clock computing device before the second-clock computing device formally issues the second command to operate the second-clock computing device; and
   in response to the second command that the second-clock computing device formally issues to operate the second-clock computing device, the command receiver receives the second command.

3. The asynchronous bridge as claimed in claim 1, further comprising:
   a prefetch buffer; and
   a command processor, receiving a prefetch request that is generated by the command prefetcher in response to the prefetched second command, reading prefetched data from the second-clock computing device in response to the prefetch request, and storing the prefetched data in the prefetch buffer,
   wherein the prefetched data stored in the prefetch buffer is returned to the first-clock computing device when the command receiver receives the second command from the first-clock computing device.

4. The asynchronous bridge as claimed in claim 3, wherein:
   the prefetch buffer is managed by a prefetch list, and
   in response to the command processor storing the prefetched data in the prefetch buffer, the command prefetcher programs the prefetch list to relate the prefetched data with the second command.

5. The asynchronous bridge as claimed in claim 4, wherein,
   when receiving the second command, the command receiver searches the prefetch list, and when the command receiver learns that the prefetched data related with the second command is stored in the prefetch buffer, the command receiver reads the prefetch buffer to return the prefetched data to the first-clock computing device.

6. The asynchronous bridge as claimed in claim 5, further comprising:
a read buffer, for performing asynchronous processing on a non-prefetched read command that is issued by the first-clock computing device to operate the second-clock computing device.

7. The asynchronous bridge as claimed in claim 6, wherein,
the first command is a read command,
when the command receiver receives the first command and confirms that the first command is not annotated in the prefetch list, the command receiver generates a read request to operate the command processor, and
in response to the read request, the command processor obtains read data from the second-clock computing device and stores the read data in the read buffer to be returned to the first-clock computing device.

8. The asynchronous bridge as claimed in claim 7, further comprising:
a write buffer, for performing asynchronous processing on a write command which is issued by the first-clock computing device to operate the second-clock computing device.

9. The asynchronous bridge as claimed in claim 8, wherein,
when the command receiver receives a third command that is a write command issued by the first-clock computing device, the command receiver stores write data in the write buffer and generates a write request to operate the command processor, and
in response to the write request, the command processor obtains write data from the write buffer, and provides the second-clock computing device with the write data obtained from the write buffer.

10. The asynchronous bridge as claimed in claim 7, wherein,
the command processor processes the read request with a priority higher than that of the prefetch request.

11. The asynchronous bridge as claimed in claim 7, wherein,
when the second command that is different from the first command is pushed into a direct memory access module of the first-clock computing device, the command prefetcher downloads the second command from the direct memory access module, and generates the prefetch request to operate the command processor, and
the second-clock computing device supplies the read data requested by the first command and the prefetched data requested by the second command through the command processor.

12. An asynchronous processing method for devices running different clocks, comprising:
receiving a first command from a first-clock computing device, wherein the first command is issued to operate a second-clock computing device; and
prefetching a second command from the first-clock computing device before the first-clock computing device receives notice of execution completion of the first command;
wherein, when the first-clock computing device formally issues the second command to operate the second-clock computing device, the second-clock computing device already operates in response to the prefetched second command.

13. The asynchronous processing method as claimed in claim 12, further comprising:
providing a prefetch buffer;
generating a prefetch request in response to the prefetched second command;
reading prefetched data from the second-clock computing device in response to the prefetch request; and
storing the prefetched data in the prefetch buffer, wherein the prefetched data is returned to the first-clock computing device in response to the second command that is issued by the first-clock computing device to operate the second-clock computing device.

14. The asynchronous processing method as claimed in claim 13, further comprising:
establishing a prefetch list to manage the prefetch buffer; and
programing the prefetch list to relate the prefetched data with the second command when the prefetched data is pushed into the prefetch buffer.

15. The asynchronous processing method as claimed in claim 14, further comprising:
when receiving the second command that is received from the first-clock computing device after prefetching of the second command, searching the prefetch list and to learn that the prefetched data related with the second command is stored in the prefetch buffer, and returning the prefetched data read from the prefetch buffer to the first-clock computing device.

16. The asynchronous processing method as claimed in claim 15, further comprising:
providing a read buffer, for performing asynchronous processing on a non-prefetched read command that is issued by the first-clock computing device to operate the second-clock computing device.

17. The asynchronous processing method as claimed in claim 16, further comprising:
when receiving the first command that is a read command and confirming that the first command is not annotated in the prefetch list, generating a read request; and
in response to the read request, obtaining read data from the second-clock computing device and storing the read data in the read buffer to be returned to the first-clock computing device.

18. The asynchronous processing method as claimed in claim 17, further comprising:
providing a write buffer, for asynchronous processing of a write command that the first-clock computing device issues to operate the second-clock computing device.

19. The asynchronous processing method as claimed in claim 18, further comprising:
when receiving a third command that is a write command issued from the first-clock computing device, storing write data in the write buffer, and generating a write request; and
in response to the write request, obtaining write data from the write buffer, and providing the second-clock computing device with the write data.

20. The asynchronous processing method as claimed in claim 17, wherein:
the read request is processed with a priority higher than that of the prefetch request.

21. The asynchronous processing method as claimed in claim 17, further comprising:
when the second command that is different from the first command is pushed into a direct memory access module of the first-clock computing device, downloading the second command from the direct memory access module, and generating the prefetch request, to operate the second-clock computing device to supply the read data requested by the first command and the prefetched data requested by the second command in sequence.

* * * * *